(No Model.)
C. W. BEISER.
CAPPING FOR FENCES.
No. 339,362. Patented Apr. 6, 1886.
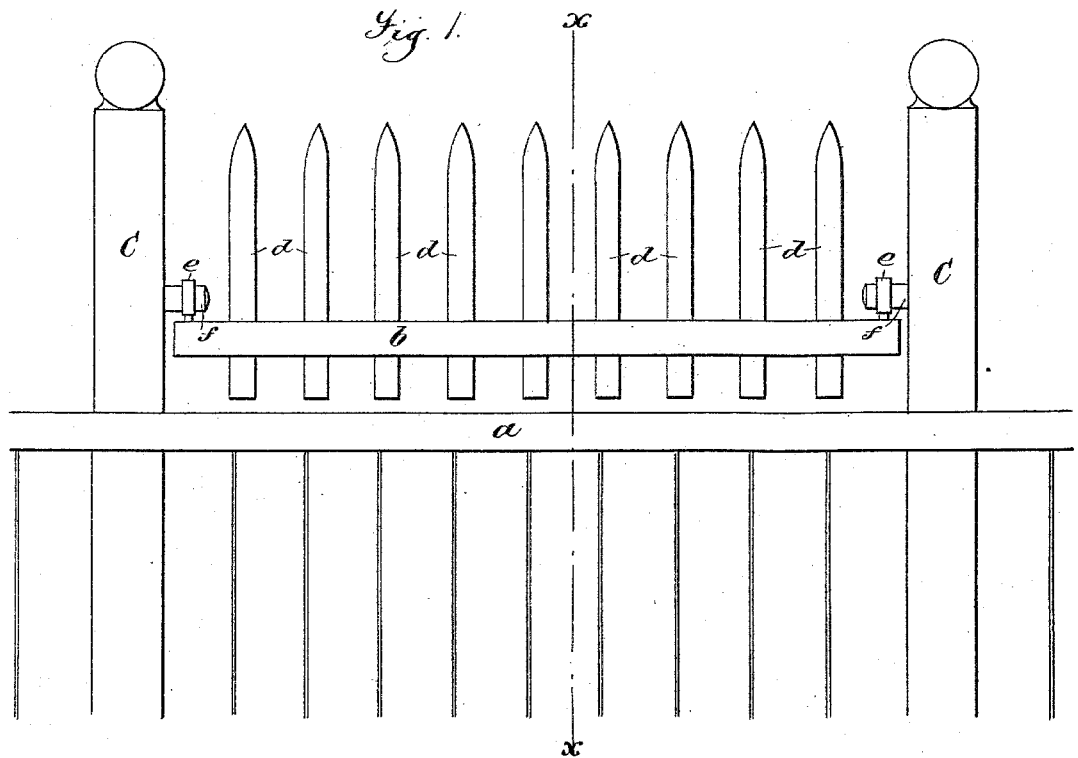
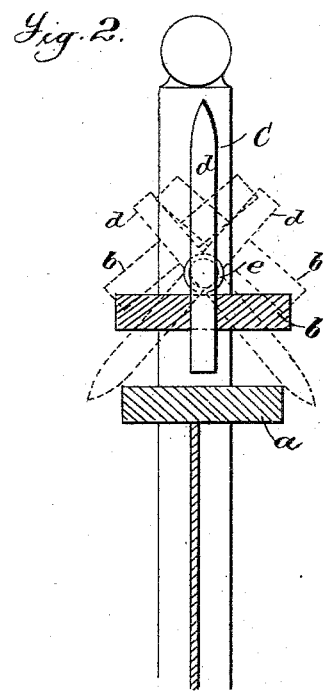

UNITED STATES PATENT OFFICE.

CHARLES W. BEISER, OF BROOKLYN, NEW YORK.

CAPPING FOR FENCES.

SPECIFICATION forming part of Letters Patent No. 339,362, dated April 6, 1886.

Application filed September 22, 1885. Serial No. 177,803. (No model.)

*To all whom it may concern:*

Be it known that I, CHARLES W. BEISER, a citizen of the United States, residing at Brooklyn, in the county of Kings and State of New York, have invented a certain new, useful, and Improved Automatic Capping for Fences, of which the following is a full, clear, and exact description.

This invention relates to an improved attachment for fences, the object being to provide a cap-piece which can be applied to any fence, and which will prevent cats or other animals from climbing over the fence or resting or moving on the same.

To this end the invention consists in a cap-piece for fences comprising a strip forming the base and having a series of short pickets or spikes projecting therefrom, the whole being pivotally hung by rings and pins between two posts or uprights, so that the slightest pressure from either side will cause it to swing in the direction of such pressure, and thus dislodge the animal, as hereinafter more fully set forth and claimed.

In the accompanying drawings, in both figures of which like parts are designated by similar letters of reference, Figure 1 is a side view in elevation of my said invention and a portion of a fence to which it is applied. Fig. 2 is a section thereof, taken on the line $x\ x$, Fig. 1.

$a$ designates the upper portion of a fence of the kind usually found in the back yards of city dwellings.

$b$ designates the base of my cap-piece, which may be of any desired shape in cross-section; but as shown is a flat strip of wood of a length to fit between posts $c$, which may be the ordinary fence-posts or extensions thereof, or short posts applied to the fence at any desired point and held in place by any suitable means, as by nails or screws for instance.

To the base $b$ are attached short pickets or spikes $d$. They are preferably secured in place by dovetailing or wedging them in the base, so that their butts will project downwardly far enough to prevent any animal from passing between the base and the top rail of the fence, but still leaving a space sufficient to allow the structure to swing freely. Each end of the base is provided with a ring or staple, $e$, by means of which it can be suspended on pins $f$, extending from the posts $c$. When thus suspended, the normal position of the base and its spikes or pickets is that shown in Fig. 1 of the drawings. The slightest pressure, however, from either side will cause the structure to swing, deflecting the pickets, as the base cants, in the direction from which the pressure comes, as shown by the dotted lines in Fig. 2. The weight of a cat or other animal attempting to climb on the base will cause it to swing, and the animal will be thrown or frightened away by the tilting of the base.

I propose to make these cap-pieces in sections of suitable length—say ten feet—so that they can be conveniently packed and transported. They are inexpensive and simple in construction, and do not require skilled labor to apply them to a fence, as it is only necessary to nail the short posts to the fence the proper distances apart and suspend the piece carrying the pickets between the posts by means of the rings and pins.

I do not broadly claim a spiked or pointed rotating or swinging reel or fender or capping for fences, the same not being, as thus stated, original with me.

What I claim as my invention, and desire to secure by Letters Patent, is—

The combination of the base $b$, pickets $d$, and rings or staples $e$ with the posts $c$ and pins $f$, substantially as described, for the purpose specified.

In testimony whereof I have hereunto set my hand this 17th day of July, A. D. 1885.

CHARLES W. BEISER.

Witnesses:
ARTHUR C. WEBB,
GEORGE H. BOTTS.